(12) United States Patent
Guan

(10) Patent No.: US 9,189,690 B2
(45) Date of Patent: Nov. 17, 2015

(54) TARGET POINT ARRIVAL DETECTOR, METHOD OF DETECTING TARGET POINT ARRIVAL, STORAGE MEDIUM OF PROGRAM OF DETECTING TARGET POINT ARRIVAL AND VEHICLE-MOUNTED DEVICE CONTROL SYSTEM

(71) Applicant: Haike Guan, Kanagawa (JP)

(72) Inventor: Haike Guan, Kanagawa (JP)

(73) Assignee: Ricoh Company, Ltd., Tokyo (JP)

( * ) Notice: Subject to any disclaimer, the term of this patent is extended or adjusted under 35 U.S.C. 154(b) by 49 days.

(21) Appl. No.: 14/060,781

(22) Filed: Oct. 23, 2013

(65) Prior Publication Data
US 2014/0133699 A1    May 15, 2014

(30) Foreign Application Priority Data

Nov. 13, 2012  (JP) .................................. 2012-249684
Aug. 27, 2013  (JP) .................................. 2013-175175

(51) Int. Cl.
*G06T 7/00*     (2006.01)
*G06K 9/00*    (2006.01)

(52) U.S. Cl.
CPC .......... *G06K 9/00798* (2013.01); *G06T 7/0048* (2013.01); *G06T 2207/10016* (2013.01); *G06T 2207/10028* (2013.01); *G06T 2207/30252* (2013.01)

(58) Field of Classification Search
CPC .............................. G06K 9/3241; G06T 7/602
See application file for complete search history.

(56) References Cited

U.S. PATENT DOCUMENTS

| | | | |
|---|---|---|---|
| 5,410,346 A * | 4/1995 | Saneyoshi et al. | 348/116 |
| 5,606,627 A * | 2/1997 | Kuo | 382/154 |
| 6,477,260 B1 * | 11/2002 | Shimomura | 382/106 |
| 6,985,619 B1 * | 1/2006 | Seta et al. | 382/154 |
| 7,636,631 B2 * | 12/2009 | Shimizu et al. | 701/437 |
| 7,650,217 B2 * | 1/2010 | Ueyama | 701/96 |
| 8,611,609 B2 * | 12/2013 | Oyama | 382/104 |
| 8,874,317 B2 * | 10/2014 | Marczok et al. | 701/41 |
| 2003/0099377 A1 * | 5/2003 | Hanawa | 382/104 |
| 2006/0233424 A1 * | 10/2006 | Miyajima et al. | 382/104 |
| 2008/0309517 A1 * | 12/2008 | Saito | 340/937 |
| 2009/0190827 A1 * | 7/2009 | Saito | 382/154 |
| 2011/0066343 A1 * | 3/2011 | Ota et al. | 701/70 |
| 2012/0207348 A1 * | 8/2012 | Saito | 382/103 |
| 2012/0294482 A1 * | 11/2012 | Kasaoki | 382/103 |
| 2012/0314933 A1 * | 12/2012 | Morifuji et al. | 382/154 |
| 2014/0192156 A1 * | 7/2014 | Kumai et al. | 348/43 |

FOREIGN PATENT DOCUMENTS

| | | |
|---|---|---|
| JP | 2002-150302 | 5/2002 |
| JP | 2010-271964 | 12/2010 |

* cited by examiner

*Primary Examiner* — Kim Vu
*Assistant Examiner* — Molly Delaney
(74) *Attorney, Agent, or Firm* — Oblon, McClelland, Maier & Neustadt, L.L.P.

(57) ABSTRACT

A target point arrival detector for detecting that a vehicle arrives at a target point based on an image ahead of the vehicle moving on a surface captured by an image capturing unit includes a target point arrival signal output unit, using a processing circuit, to output a signal indicating that the vehicle arrives at the target point where an inclination condition of a surface ahead of the vehicle with respect to a surface over which the vehicle moves changes to a downward based on the captured image.

8 Claims, 9 Drawing Sheets

(a) (b)

TARGET POINT ARRIVAL DETECTOR, METHOD OF DETECTING TARGET POINT ARRIVAL, STORAGE MEDIUM OF PROGRAM OF DETECTING TARGET POINT ARRIVAL AND VEHICLE-MOUNTED DEVICE CONTROL SYSTEM

CROSS-REFERENCE TO RELATED APPLICATION

This application claims priority pursuant to 35 U.S.C. §119 to Japanese Patent Application Nos. 2012-249684, filed on Nov. 13, 2012 and 2013-175175, filed on Aug. 27, 2013 in the Japan Patent Office, the disclosures of which are hereby incorporated by reference herein in their entirety.

BACKGROUND

1. Technical Field

The present invention relates to a target point arrival detector, a target point arrival detection program and a vehicle-mounted device control system that detects a vehicle arrives at a given target point based on a plurality of images, captured by a plurality of image capturing unit, ahead of a vehicle such as automobile and robot that moves on surfaces.

2. Background Art

Conventional road surface recognition apparatuses identify three-dimensional shape of a road surface over which a vehicle moves (such as convexities/concavities in the road surface ahead of the vehicle). The vehicle mounts image capturing units to capture an image ahead of the vehicle. Based on a luminance image and a distance image (parallax image data) obtained from the image captured by the image capturing units, three-dimensional shapes of lane markers on a road surface is computed, and the three-dimensional shape of the road surface is identified from the three-dimensional shapes of the lane markers.

As the vehicle approaches the top of a hill, the vehicle arrives at a point where the road surface inclination changes and that uphill road surface becomes a flat road surface or a downhill road surface, which is the point where the driver of the vehicle cannot see beyond the top of the hill. A similar situation exists as the vehicle arrives at a point where the road surface inclination changes from a flat road surface to a downhill road surface.

Therefore, when the road surface inclination of the road ahead of the vehicle changes to downward with respect to the road surface where the vehicle is moving (road surface right below the vehicle), the driver of the vehicle has a poor vision for the ahead of the vehicle.

Therefore, because the driver of the vehicle has a poor vision at a point where the road surface inclination changes to a surface slope inflection point, the driver's recognition of obstacles existing ahead of the vehicle such as other vehicles and pedestrians existing in the ahead of the vehicle is delayed, and the driver's recognition of road condition changing ahead of the vehicle such as sharp curve is delayed, and such delay may cause accidents.

SUMMARY

In one aspect of the present invention, a target point arrival detector for detecting that a vehicle arrives at a target point based on an image ahead of the vehicle moving on a surface captured by an image capturing unit is devised. The target point arrival detector includes a target point arrival signal output unit, using a processing circuit, to output a signal indicating that the vehicle arrives at the target point where a surface ahead of the vehicle changes to a downward slope with respect to a surface over which the vehicle moves based on the captured image.

In another aspect of the present invention, a method of detecting a condition of a surface ahead of a vehicle moving on the surface based on a plurality of images captured with an image capturing unit is devised. The method includes the steps of generating parallax information based on the plurality of captured images captured with the image capturing unit; generating parallax histogram information, based on the parallax information, indicating parallax value mapping condition for each line prepared by dividing the captured image into a plurality of areas vertically; selecting a group of parallax values that decrease toward an upper part of the captured image among parallax values greater than a preset reference value, based on the parallax histogram information; generating approximated curved line information for the selected group of parallax values; and outputting a signal indicating that the vehicle arrives at a target point when the approximated curved line information satisfies a given target point arrival condition.

In another aspect of the present invention, a non-transitory computer-readable storage medium storing a line recognition program that, when executed by a computer having a processor, causes the computer to execute a method of detecting a condition of a surface ahead of a vehicle moving on the surface based on a plurality of images captured with an image capturing unit is devised. The method includes the steps of generating parallax information based on the plurality of captured images captured with the image capturing unit; generating parallax histogram information, based on the parallax information, indicating parallax value mapping condition for each line prepared by dividing the captured image into a plurality of areas vertically; selecting a group of parallax values that decrease toward an upper part of the captured image among parallax values greater than a preset reference value, based on the parallax histogram information; generating approximated curved line information for the selected group of parallax values; and outputting a signal indicating that the vehicle arrives at a target point when the approximated curved line information satisfies a given target point arrival condition.

BRIEF DESCRIPTION OF THE DRAWINGS

A more complete appreciation of the disclosure and many of the attendant advantages and features thereof can be readily obtained and understood from the following detailed description with reference to the accompanying drawings, wherein:

FIG. 8(*b*) is a line parallax histogram map (V map) indicating parallax histogram of each line of parallax image of FIG. 8(*a*);

FIG. 12(*b*) is an example image of the surface in a captured image (luminance image) captured under a condition of FIG. 12(*a*);

FIG. 12(*c*) is a line parallax histogram map (V map) corresponding to FIG. 12(*b*);

FIG. 13(*b*) is an example image of the surface in a captured image (luminance image) captured under a condition of FIG. 13(*a*);

FIG. 13(*c*) is a line parallax histogram map (V map) corresponding to FIG. 13(*b*);

FIG. 14(*b*) is an example image of the surface in a captured image (luminance image) captured under a condition of FIG. 14(*a*);

FIG. 14(*c*) is a line parallax histogram map (V map) corresponding to FIG. 14(*b*);

Figure 1:
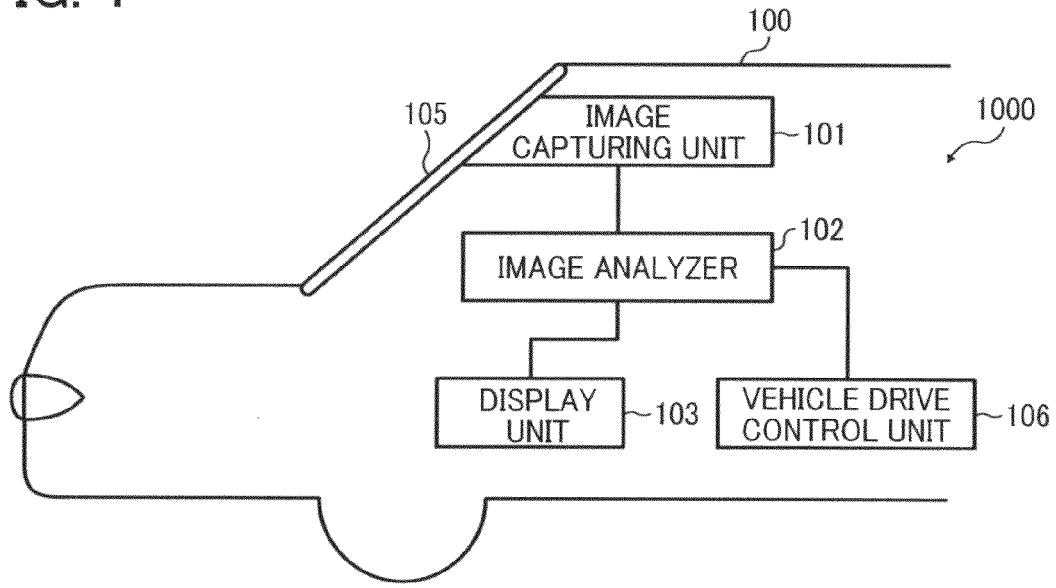
FIG. 1 shows a schematic configuration of a vehicle-mounted device control system according to an example embodiment.

The accompanying drawings are intended to depict exemplary embodiments of the present invention and should not be interpreted to limit the scope thereof. The accompanying drawings are not to be considered as drawn to scale unless explicitly noted, and identical or similar reference numerals designate identical or similar components throughout the several views.

DETAILED DESCRIPTION

A description is now given of exemplary embodiments of the present invention. It should be noted that although such terms as first, second, etc. may be used herein to describe various elements, components, regions, layers and/or sections, it should be understood that such elements, components, regions, layers and/or sections are not limited thereby because such terms are relative, that is, used only to distinguish one element, component, region, layer or section from another region, layer or section. Thus, for example, a first element, component, region, layer or section discussed below could be termed a second element, component, region, layer or section without departing from the teachings of the present invention.

In addition, it should be noted that the terminology used herein is for the purpose of describing particular embodiments only and is not intended to be limiting of the present invention. Thus, for example, as used herein, the singular forms "a", "an" and "the" are intended to include the plural forms as well, unless the context clearly indicates otherwise. Moreover, the terms "includes" and/or "including", when used in this specification, specify the presence of stated features, integers, steps, operations, elements, and/or components, but do not preclude the presence or addition of one or more other features, integers, steps, operations, elements, components, and/or groups thereof.

Furthermore, although in describing views shown in the drawings, specific terminology is employed for the sake of clarity, the present disclosure is not limited to the specific terminology so selected and it is to be understood that each specific element includes all technical equivalents that operate in a similar manner and achieve a similar result. Referring now to the drawings, an apparatus or system according to an example embodiment is described hereinafter.

A description is given of a control system to control vehicle-mounted devices according to an example embodiment, in which an image capturing device is installed in a vehicle. The image capturing device can be used with the control system to control vehicle-mounted devices, but the image capturing device can be applied for other systems having an object detector to detect an object based on captured images captured by the image capturing device. The vehicle itself is not limited to any specific type of vehicle and may include various types of vehicles, such as automobiles, robots, or the like.

A description is given of a target point arrival detector according to an example embodiment of the present invention, wherein the target point arrival detector can be employed for a vehicle-mounted device control, which is an example of a vehicle system.

FIG. 1 shows a schematic configuration of a vehicle-mounted device control system 1000 according to an example embodiment employed for a vehicle 100. For example, the vehicle-mounted device control system 1000 can detect whether a surface ahead of the vehicle 100 is a relatively downward sloping surface using an image data of an area ahead of the vehicle 100 captured by an image capturing unit mounted on the vehicle 100. Based on this detection result, the vehicle-mounted device control system controls various vehicle-mounted devices. The vehicle 100 is a mobile vehicle such as an automobile, a robot, or the like that can move on a surface such as a road surface.

The vehicle-mounted device control system includes an image capturing unit 101. The image capturing unit 101 is used as an image capturing device to capture an image of area ahead of the vehicle 100 that moves in a given direction, in which the area ahead of the vehicle 100 may be referred to as an image capturing area. The image capturing unit 101 is mounted, for example, near a rear-view mirror disposed at a windshield 105 of the vehicle 100.

Various data such as image data captured by the image capturing unit 101 is input to the image analyzer 102 used as an image processing unit. The image analyzer 102 analyzes the data, transmitted from the image capturing unit 101, to recognize a surface over which the vehicle 100 moves whether the vehicle 100 can move on the surface, and to recognize whether a surface ahead of the vehicle 100 is a slope with respect to a surface right below the vehicle 100 where the vehicle 100 is moving. For example, when the surface ahead of the vehicle 100 is a downward slope surface with respect to the surface where the vehicle 100 is moving (i.e., surface right below the vehicle 100), it means a relative surface inclination condition is a downward slope.

Further, the result computed by the image analyzer 102 is transmitted to a vehicle drive control unit 106, which can be referred to as the vehicle controller. The vehicle drive control unit 106 can provide a cruise assistance control based on a recognition result of the surface obtained by the image analyzer 102. Specifically, when the vehicle 100 is to be drifted from one lane to another lane on the road surface, the vehicle drive control unit 106 conducts the cruise assistance control such as reporting a warning to a driver of the vehicle 100 and controlling the steering and brakes of the vehicle 100.

Further, based on the recognition result of the image analyzer 102 that the surface where the vehicle 100 is now moving is to become a downward slope (when the relative surface inclination changes to downward), the vehicle drive control unit 106 conducts the cruise assistance control such as reporting a warning to a driver of the vehicle 100, and the vehicle speed control that decreases the vehicle speed of the vehicle 100.

Figure 2:
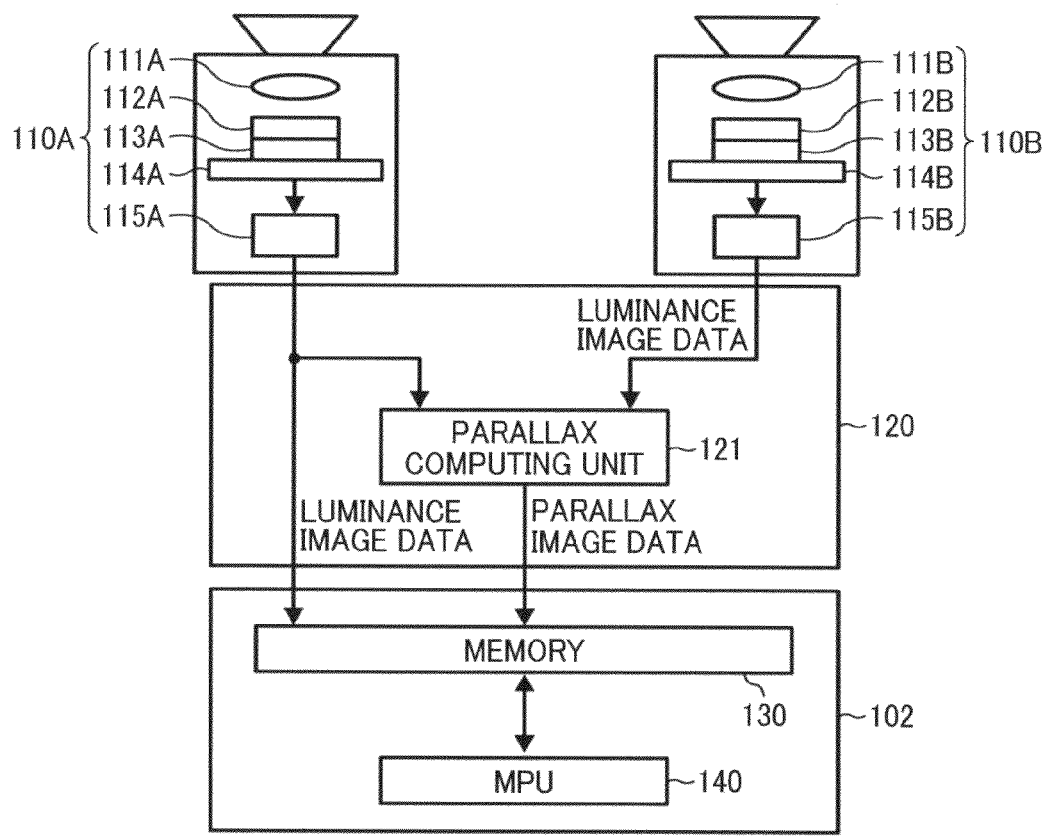
FIG. 2 shows a schematic configuration of an image capturing unit and an image analyzer of the vehicle-mounted device control system of FIG. 1.

FIG. 2 shows a schematic configuration of the image capturing unit 101 and the image analyzer 102. The image capturing unit 101 is, for example, a stereo camera having a first capturing unit 110A and a second capturing unit 110B as image capturing units, in which the first capturing unit 110A and the second capturing unit 110B have the same configuration.

The first capturing unit 110A is configured with a first capturing lens 111A, a first optical filter 112A, a first image sensor 113A, a first sensor board 114A, and a first signal processor 115A. The second capturing unit 110B is configured with a second capturing lens 111B, a second optical filter 112B, a second image sensor 113B, a second sensor board 114B, and a second signal processor 114B.

The first sensor board 114A is disposed with the first image sensor 113A having arranged image capturing elements two-dimensionally, and the second sensor board 114B is disposed with the second image sensor 113B having arranged image capturing elements two-dimensionally.

The first signal processor 115A converts analog electrical signals output from the first sensor board 114A (i.e., light quantity received by light receiving elements on the first image sensor 113A) to digital signals to prepare captured image data, and outputs the captured image data. The second signal processor 114B converts analog electrical signals output from the second sensor board 114B (i.e., light quantity received by light receiving elements on the second image sensor 113B) to digital signals to prepare captured image data, and outputs the captured image data. The image capturing unit 101 can output luminance image data and parallax image data.

Further, the image capturing unit 101 includes a processing hardware 120 such as field-programmable gate array (FPGA). The processing hardware 120 includes a parallax computing unit 121 to obtain parallax image from the luminance image data output from the first capturing unit 110A and the second capturing unit 110B. Specifically, the parallax computing unit 121 computes the parallax between an image captured by the first capturing unit 110A and an image captured by the second capturing unit 110B by comparing a corresponding image portion on the captured images. The parallax computing unit 121 can be used as a parallax information generator.

The value of parallax can be computed using one image captured by one of the first and second capturing units 110A and 110B as a reference image and other image captured by other one of the first and second capturing units 110A and 110B as a comparing image. In the image capturing area, a concerned image portion at the same point of the reference image and the comparing image are compared to compute a positional deviation between the reference image and the comparing image as the parallax of the concerned image portion. By using fundamental of triangulation, the distance to the same point of the concerned image portion in the image capturing area can be computed based on the parallax.

Figure 3:
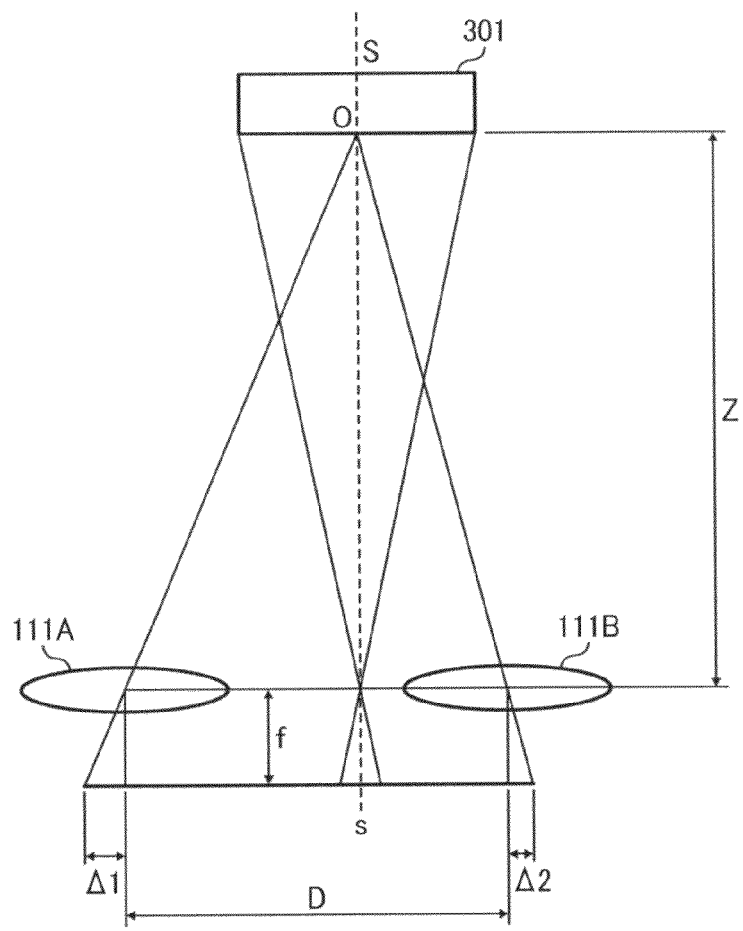
FIG. 3 shows a scheme of computing parallax using images captured by a left camera and a right camera.

The parallax value can computed using the fundamental of triangulation as shown in FIG. 3, in which with respect to the point O on the object 301, a distance between the focal position and focal center for the left image becomes $\Delta 1$ and a distance between the focal position and focal center for the right image becomes $\Delta 2$, with which the parallax $\Delta$ can be defined as $\Delta = \Delta 1 + \Delta 2$.

The image analyzer 102 includes, for example, a memory 130, and a micro processing unit (MPU) 140. The memory 130 stores luminance image data and parallax image data output from the image capturing unit 101. The MPU 140 installs software used for the recognition processing of recognition target and controlling the parallax calculation. The MPU 140 conducts various recognition processing using the luminance image data and parallax image data stored in the memory 130.

Figure 4:
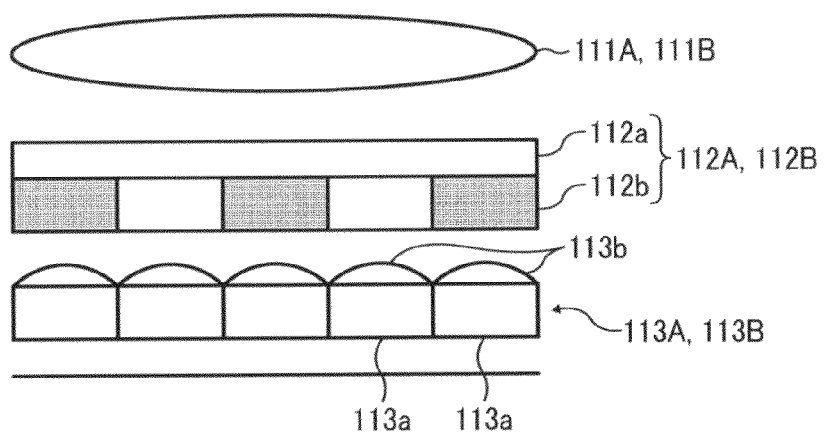
FIG. 4 shows a schematic configuration of an optical filter and an image sensor of an image capturing unit viewed from a direction perpendicular to a light transmission direction.

FIG. 4 shows a schematic configuration of the first optical filter 112A and the second optical filter 112B, and the first image sensor 113A and the second image sensor 113B viewed from a direction perpendicular to a light transmission direction. Each of the first image sensor 113A and the second image sensor 113B is an image sensor using, for example, a charge coupled device (CCD), a complementary metal oxide semiconductor (CMOS) or the like. The image capturing element (or light receiving element) of the image sensors 113A and 113B employs, for example, a photodiode 113a. The photodiode 113a is disposed for each of image capturing pixels by arraying the photodiodes 113a two-dimensionally. Further, a micro lens 113b is disposed at an incidence side of each of the photodiodes 113a to increase light condensing efficiency. The first image sensor 113A and the second image sensor 113B are bonded to a printed wiring board (PWB) using wire bonding or the like, with which the first sensor board 114A and the second sensor board 114B are formed.

The first optical filter 112A and the second optical filter 112B are disposed close to the micro lens 113b of the first image sensor 113A and the second image sensor 113B. Each of the first optical filter 112A the second optical filter 112B is configured with a transparent filter base 112a and a light separation filter 112b formed on the filter base 112a as shown in FIG. 4, but not limited hereto. For example, the optical filter can be configured using a polarization filter instead of the light separation filter or can be configured using the light separation filter and the polarization filter. The light separation filter 112b is divided into a plurality of areas, wherein each area is corresponded to each one of photodiodes 113a disposed on the first image sensor 113A and the second image sensor 113B.

The first optical filter 112A can be spaced apart from the first image sensor 113A, and the second optical filter 112B can be spaced apart from the second image sensor 113B. Further, the first optical filter 112A and the first image sensor 113A can be contacted with each other, and the second optical filter 112B and the second image sensor 113B can be contacted with each other. When the first optical filter 112A and the first image sensor 113A are contacted with each other, and the second optical filter 112B and the second image sensor 113B are contacted with each other, each filer area of the first optical filter 112A and each photodiode 113a on the first image sensor 113A can be matched easily, and each filer area of the second optical filter 112B and each photodiode 113a on the second image sensor 113B can be matched easily. The first optical filters 112A and 112B and the image sensors 113A and image sensor 113B can be bonded with each other, for example, using ultraviolet (UV) adhesives. Further, a spacer can be disposed outside of an effective pixel area for image capturing between the first optical filters 112A and 112B and the image sensors 113A and 113B and then sides of the outside of effective pixel area can be bonded by UV adhesives or heat pressing.

Figure 5:
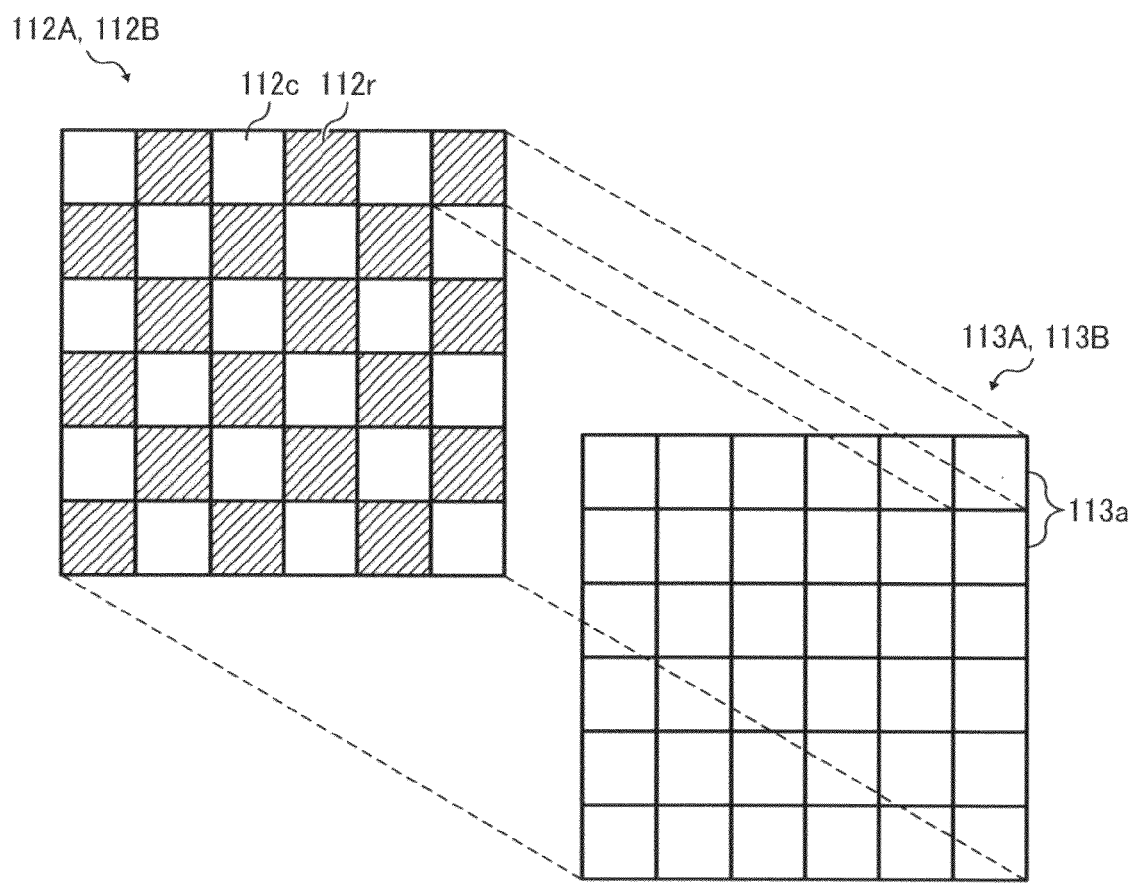
FIG. 5 shows a pattern of dividing an area of an optical filter.

FIG. 5 shows a pattern of dividing an area of the first optical filter 112A and the second optical filter 112B. As shown in FIG. 5, each of the first optical filter 112A and the second optical filter 112B is divided into two types of segment area, which may be referred to as a first segment area 112r and a second segment area 112c, and each segment area corresponds to one of the photodiodes 113a disposed on the first image sensor 113A and the second image sensor 113B. In this configuration, the light received by each one of photodiodes 113a disposed on the first image sensor 113A and the second image sensor 113B can be obtained as spectral information corresponding to the type of segment area of the light separation filter 112b where the received light passes through.

In an example embodiment, the first segment area 112r of the first optical filter 112A and the second optical filter 112B can be used as, for example, the red light separation segment area 112r that selectively passes only red color light having a given wavelength for red, and the second segment area 112c of the first optical filter 112A and the second optical filter 112B can be used as, for example, a non-separation segment 112c that passes light without wavelength selection.

As shown in FIG. 5, the first segment area 112r and the second segment area 112c are disposed on the first optical filter 112A and the second optical filter 112B with a checkerboard pattern. With this configuration, red luminance image can be obtained from signals output from image capturing pixels corresponded to the first segment area 112r, and non-light-separation luminance image can be obtained from signals output from image capturing pixels corresponded to the second segment area 112c. With this configuration, two types of captured image data corresponding to the red luminance image and non-light-separation luminance image can be obtained with one single capturing operation. As to these captured image data, the number of image pixels becomes smaller than the number of image capturing pixels, in which the known image interpolation process can be used to obtain high resolution image.

In an example embodiment, the above obtained non-light-separation luminance image data can be used for various detection processes such as detecting white line such as a lane on a road surface and detecting a relatively downward sloping surface ahead of the vehicle.

A description is given of a process of detecting whether a vehicle reaches or arrives at a target point according to an example embodiment. The target point may mean a point when surface inclination changes and poor vision occurs due to the change of surface inclination. In an example embodiment, the surface inclination-changing point or surface slope inflection point having the poor vision may mean when the surface condition becomes a downward slope surface such as when the relative surface inclination condition becomes downward.

Figure 6:
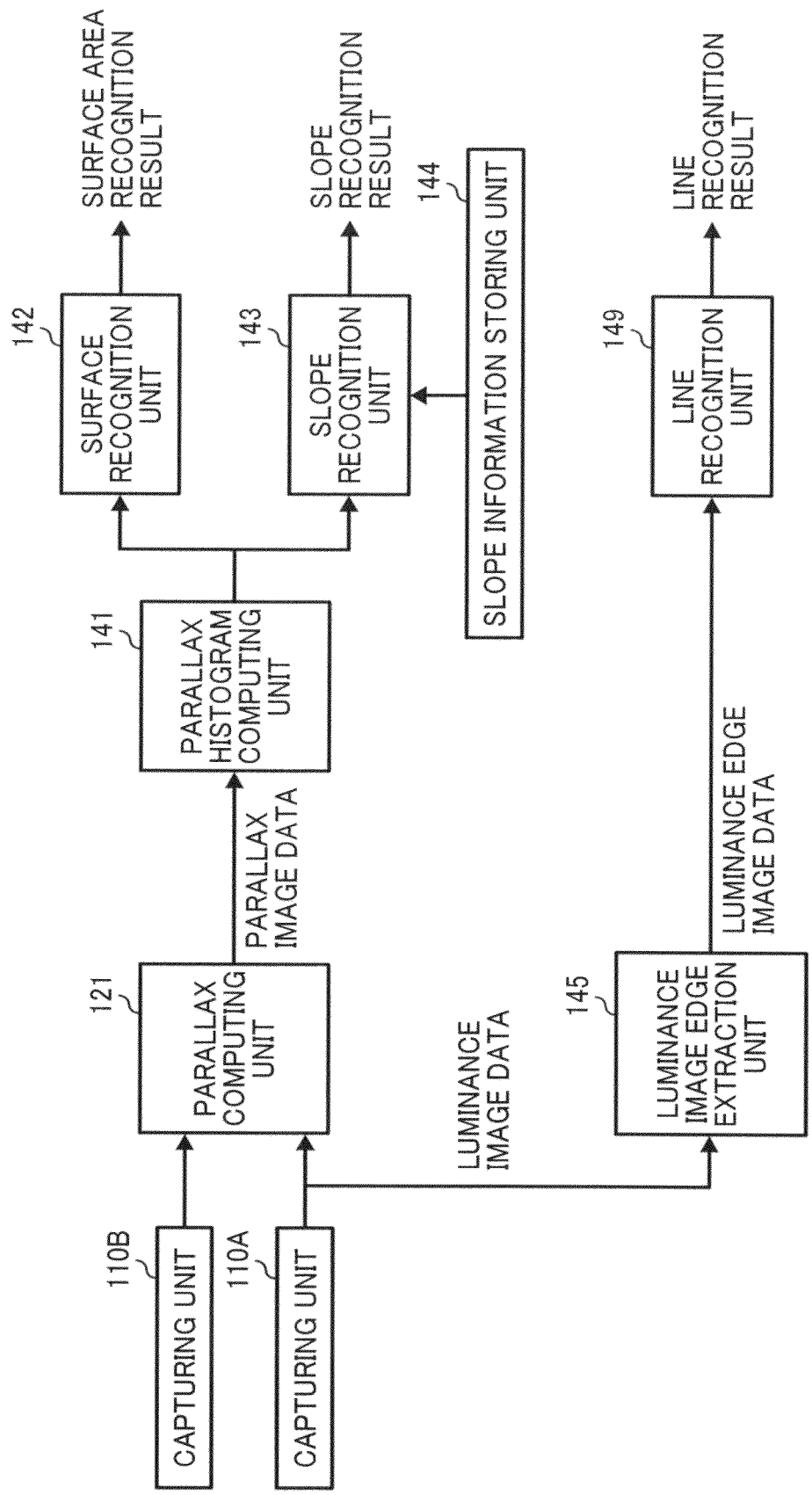
FIG. 6 is a block diagram of a target point arrival detection process according to an example embodiment.
Figure 7:
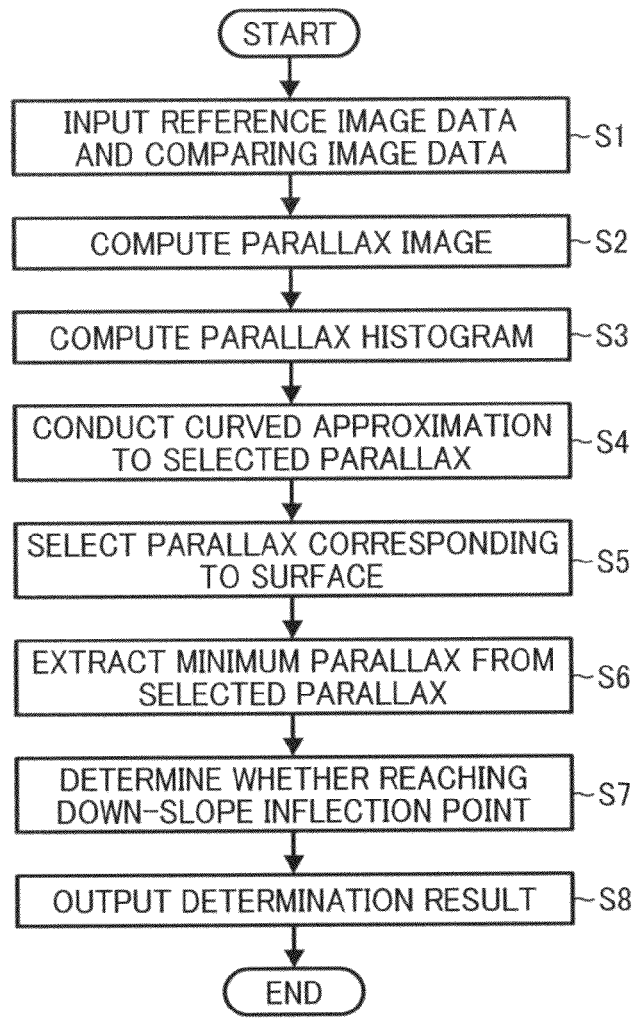
FIG. 7 is a flowchart showing steps in a process of target point arrival detection.

FIG. 6 shows a block diagram of a target point arrival detection process and FIG. 7 is a flow chart of a process showing steps of target point arrival detection according to an example embodiment, which can be conducted by the image analyzer 102.

The parallax computing unit 121 is input with reference image data, which is image data captured by the first capturing unit 110A (i.e., one of the first and second capturing units 110A and 110B) and comparing image data, which is image data captured by the second capturing unit 110B (i.e., another one of the first and second capturing units 110A and 110B) (S1), and computes parallax between the reference image data and the comparing image data (S2), and then generates and outputs parallax image data. This parallax image data corresponds to a parallax image. The parallax value $\Delta$ is computed for each image portion on the reference image data, and each pixel of each image portion can be set with a pixel value in view of the corresponding parallax value $\Delta$, and the parallax image is prepared using the pixel value of each pixel.

Specifically, the parallax computing unit 121 defines a block for one line of reference image data, wherein the block includes a plurality of pixels (e.g., 16 pixels×1 pixel) and uses one concerned pixel as the center of the block. Further, a block having the same size of the defined block of the reference image data is defined on the same line of the comparing image data. The block on the same line of the comparing image data is shifted for one pixel in the horizontal line direction (X direction) with respect to the block on the same line of reference image data.

A pixel in one block defined on the reference image data has a feature value corresponding to the pixel, and a pixel in one block defined on the comparing image data has a feature value corresponding to the pixel. A correlation value indicating correlation between the feature value corresponding to the pixel in the block defined on the reference image data and the feature value corresponding to the pixel in the block defined on the comparing image data is computed for each pixel. Then, based on the computed correlation value, among the blocks on the comparing image data, a matching process is conducted to select a block on the comparing image data having the greatest correlation with the block of the reference image data. Then, a positional deviation between the concerned pixel of the reference image data and a corresponding pixel of the block on the comparing image data selected by the matching process is computed as parallax value $\Delta$. By conducting this parallax value $\Delta$ computing process for the entire or a specific part of the reference image data, parallax image data can be obtained. Then, the obtained parallax image data is transmitted to a parallax histogram computing unit 141 that can be used as a parallax histogram information generator.

The feature value of block used for the matching process is, for example, each pixel value (i.e., luminance value) in the block. A difference between each pixel value (i.e., luminance value) in the block in the reference image data and corresponding each pixel value (i.e., luminance value) in the block in the comparing image data is computed, and the total of absolute value of the differences between pixels in the block in the reference image data and pixels in the block in comparing image data can be used as correlation value. In this case, the block having the smallest total absolute value may become the block having the greatest correlation.

Figure 8:
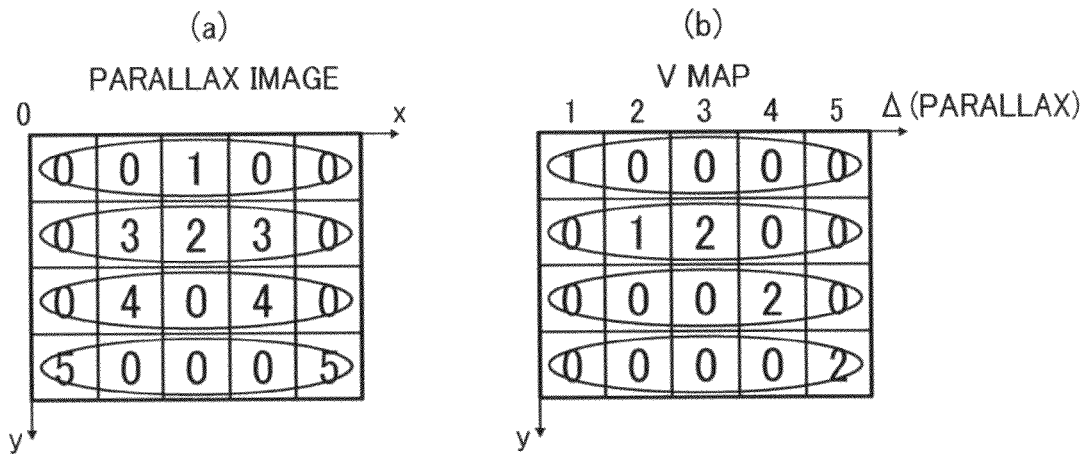
FIG. 8(*a*) is an example of parallax histogram of parallax image.

Upon obtaining the parallax image data, the parallax histogram computing unit 141 computes parallax histogram for each line of the parallax image data (S3). Specifically, when parallax image data having a parallax histogram shown in FIG. 8(a) is input, the parallax histogram computing unit 141 computes parallax histogram for each line and outputs the parallax histogram for each line. Then, based on the obtained information of parallax histogram of each line, for example, a line parallax histogram map (V map) shown in FIG. 8(b) is obtained. The V map is prepared on a two-dimensional orthogonal coordinate system, in which the vertical axis represents the vertical direction of the parallax image (i.e., position in captured image in the upper and lower direction), and the horizontal axis represents the parallax value. Each pixel on the parallax image data is mapped on the two-dimensional orthogonal coordinate system to obtain the line parallax histogram map. The line parallax histogram map can be expressed as an image by arranging pixels having pixel values corresponding to values of histogram on the above mentioned two-dimensional orthogonal coordinate system.

Figure 9:
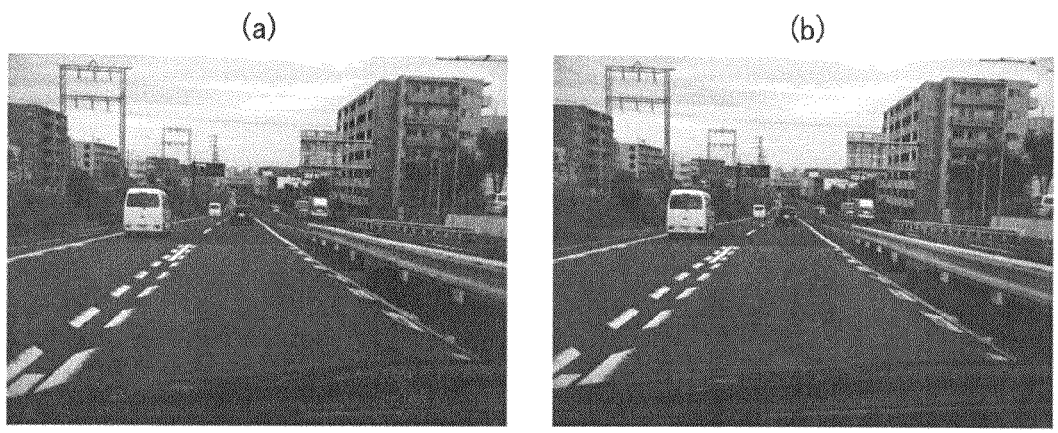
FIGS. 9(*a*) and 9(*b*) are example images of reference image and comparing image, which are luminance images captured with a capturing unit.
Figure 10:
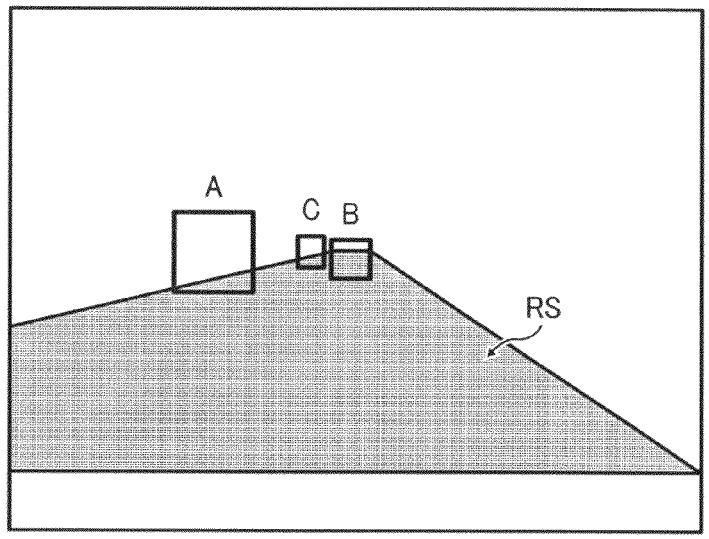
FIG. 10 is an example of schematic parallax image computed from the reference image and the comparing image shown in FIGS. 9(*a*) and 9(*b*)

FIGS. 9(a) and 9(b) are example images of the reference image and the comparing image, which are luminance images captured with the image capturing unit. FIG. 10 is an example of schematic parallax image computed from the reference image and the comparing image shown in FIGS. 9(a) and 9(b). Each pixel value in the parallax image shown in FIG. 10 corresponds to a parallax value Δ obtained from the reference image and the comparing image at the concerned pixel position. Further, object A, object B, and object C in FIG. 10 correspond to parallax values Δ of other vehicles existing ahead of the vehicle 100 in the captured image. Further, an object RS indicated in FIG. 10 is a surface area RS corresponding to a surface area ahead of the vehicle 100 such as a road surface having a parallax value Δ. The surface area RS is a surface area defined by a median strip or traffic island and a roadside step, and the vehicle moves on or over the surface area RS.

A surface recognition unit 142 recognizes the surface area RS based on information of parallax histogram of each line output from the parallax histogram computing unit 141. Specifically, the surface recognition unit 142 obtains information of parallax histogram of each line from the parallax histogram computing unit 141, and conducts the curved line approximation to pixels on the line parallax histogram map identified from the information, in which the isolated noise reduction process, smoothing process, and binary process can be conducted to the line parallax histogram map.

Figure 11:
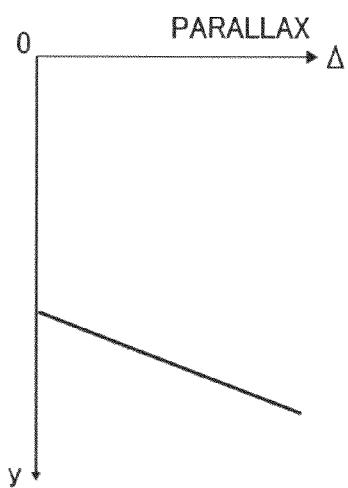
FIG. 11 is a graph of approximated curved line of pixels on a line parallax histogram map (V map) obtained from parallax image data shown in FIG. 10.

FIG. 11 is a graph of approximated curved line of pixels on the line parallax histogram map (V map) obtained from parallax image data shown in FIG. 10. FIG. 10 shows the parallax image of an image of a flat surface obtained by an image capturing operation, wherein the relative surface inclination condition is flat. Therefore, the graph of approximated curved line of pixels on the line parallax histogram map is approximated to a straight line.

The approximated curved line (or approximated straight line) shown in FIG. 11 corresponds to a lower part of the parallax image shown in FIG. 10. The straight line has a given inclination at a lower part of the line parallax histogram map, and the closer to the upper part of an image, the smaller the parallax value Δ. The pixels existing on this approximated curved line or its vicinity (i.e., pixels on parallax image) correspond to pixels displaying a target that exists substantially at the same distance and have the highest occupation ratio on each line on the parallax image, and the closer to the upper part of the image, the farther distanced from the vehicle 100 continuously.

Because the first capturing unit 110A captures an image of an area ahead of the vehicle 100, a parallax image shown in FIG. 10 can be obtained, in which the occupation ratio of the surface area RS becomes the greatest in the lower part of the parallax image. Further, the closer to the upper part of the parallax image, the smaller the parallax value Δ of the surface area RS. Further, pixels composing the surface area RS have substantially the same parallax value Δ in the same line (i.e., horizontal line). Therefore, pixels on the approximated curved line (approximated straight line) or its vicinity on the above described line parallax histogram map (V map), identified from information of parallax histogram of each line output from the parallax histogram computing unit 141, can be matched to the feature of the pixels composing the surface area RS. Therefore, pixels on the approximated curved line shown in FIG. 11 or its vicinity can be estimated as the pixels composing the surface area RS with high precision.

Based on information of parallax histogram of each line obtained from the parallax histogram computing unit 141, the surface recognition unit 142 computes the line parallax histogram map (V map), and the surface recognition unit 142 conducts the curved line approximation for the line parallax histogram map (V map). Then, the surface recognition unit 142 identifies the pixels existing on the approximated curved line or its vicinity as the pixels displaying the surface, and recognizes an image area occupied by the identified pixels as the surface area RS. As shown in FIGS. 9(a) and 9(b), a white line such as a lane exists on the surface, and the surface recognition unit 142 recognizes the surface area RS with the white line image.

The recognition result of the surface recognition unit 142 is transmitted to a later stage processing unit and used for various processing. For example, an image ahead of the vehicle 100 captured using the image capturing unit 101 is displayed on the display unit 103 such as a monitor used as an image display apparatus. For example, in the vehicle 100, the surface area RS may be displayed on a display screen with a highlighting expression so that the surface area RS can be viewed easily based on the recognition result of the surface recognition unit 142.

The information of parallax histogram of each line output from the parallax histogram computing unit 141 is also transmitted to a slope recognition unit 143 used as a target point arrival signal output unit. The slope recognition unit 143 selects a group of parallax values matched to the feature of pixels displaying the surface area RS based on information of parallax histogram of each line output from the parallax histogram computing unit 141.

Specifically, based on information of parallax histogram of each line, a group of parallax values matched to the feature that the value becomes smaller as closer to the upper part of image are selected among parallax values Δ having a frequency greater than the preset reference value. The parallax value having this feature corresponds to the parallax value for the approximated curved line (approximated straight line) shown in FIG. 11. Therefore, the slope recognition unit 143 conducts the curved line approximation to pixels on the line parallax histogram map (V map) (S4), and selects parallax values Δ of the pixels existing on the approximated curved line or its vicinity (S 5).

Further, the slope recognition unit 143 extracts a minimum parallax Δ0 positioned at the top of the image from the selected parallax values (i.e., parallax values corresponding to the surface area RS) (S6). The line having the minimum parallax Δ0 is at the top of the surface area RS in the captured image, which is a height of the image in the upper and lower direction (vertical direction).

Figure 12:
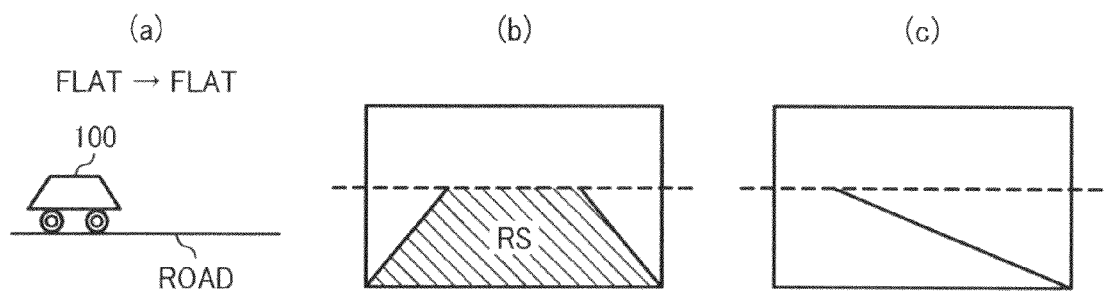
FIG. 12(*a*) is a schematic view of a vehicle and a surface of flat viewed from a side of the vehicle.

When the surface is a flat surface as shown in FIG. 12(a), the surface area RS in the captured image is displayed as shown in FIG. 12(b). Then, the approximated curved line of the line parallax histogram map (V map) obtained based on the captured image becomes a straight line as shown in FIG. 12(c).

Figure 13:
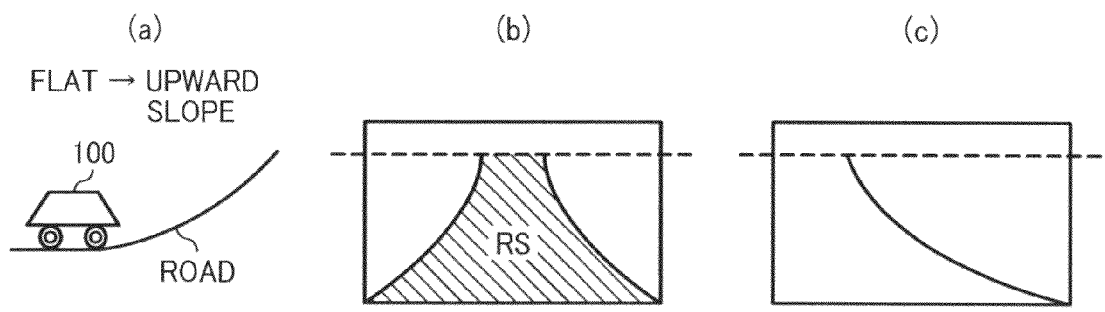
FIG. 13(*a*) is a schematic view of a vehicle and a relative surface inclination changes to upward, which means when the surface changes to an upward slope, viewed from a side of the vehicle.

When the surface changes to an upward slope (when the relative surface inclination changes to upward) as shown in FIG. 13(a), the surface area RS in the captured image is displayed as shown in FIG. 13(b). Then, the approximated curved line of the line parallax histogram map (V map) obtained based on the captured image becomes a curved line as shown in FIG. 13(c).

Figure 14:
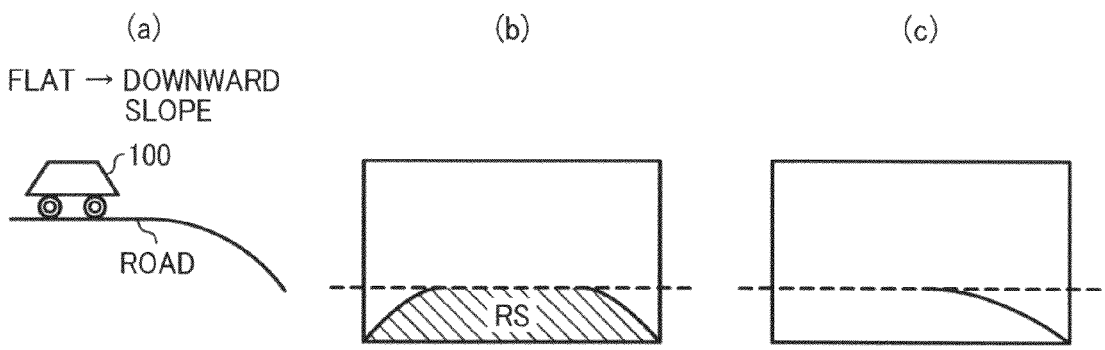
FIG. 14(*a*) is a schematic view of a vehicle and a relative surface inclination changes to downward, which means when the surface changes to a downward slope, viewed from a side of the vehicle.

When the surface changes to a downward slope (when the relative surface inclination changes to downward) as shown in FIG. 14(a), the surface area RS in the captured image is displayed as shown in FIG. 14(b). Then, the approximated curved line of the line parallax histogram map (V map) obtained based on the captured image becomes a curved line as shown in FIG. 14(c).

In an example embodiment of the present invention, when the vehicle 100 reaches or arrives at a point when a driver of the vehicle 100 has a poor vision, such point is detected, and a given control can be conducted to prevent accidents at such point. Specifically, as shown in FIG. 14(a) when the vehicle 100 arrives at a point where the surface condition changes to a downward slope (when the relative surface inclination condition changes downward), the vehicle drive control unit 106 detects such point and conducts the cruise assistance control such as reporting a warning to the driver of the vehicle 100 to decrease the speed of the vehicle 100, and the vehicle speed control that decreases the speed of the vehicle 100.

The parallax value Δ corresponded to the surface area RS becomes smaller as closer to the upper part of the captured image. Therefore, the approximated curved line composed of the parallax values Δ has a feature that the approximated curved line increases its height as closer to a left side of the image as shown in FIG. 12(c), FIG. 13(c) and FIG. 14(c) for any cases of relative surface inclination conditions of road surface. However, as shown in FIG. 12(c), FIG. 13(c) and FIG. 14(c), the line pattern of the approximated curved line becomes different depending on relative surface inclination conditions of road surface. Specifically, the line pattern of approximated curved line becomes a straight line at a point when the relative surface inclination is flat, the line pattern of approximated curved line becomes a curved line that the curvature increases gradually (curved line having decreasing curvature radius) at a point when the relative surface inclination changes to upward, and the line pattern of approximated curved line becomes a curved line that the curvature decreases gradually (curved line having increasing curvature radius) at a point when the relative surface inclination changes to downward. Therefore, the line pattern of the approximated curved line can be determined using based on such different features, with which it can detect whether the vehicle 100 arrives at a point when the relative surface inclination changes to downward (S7 and S8).

Figure 15:
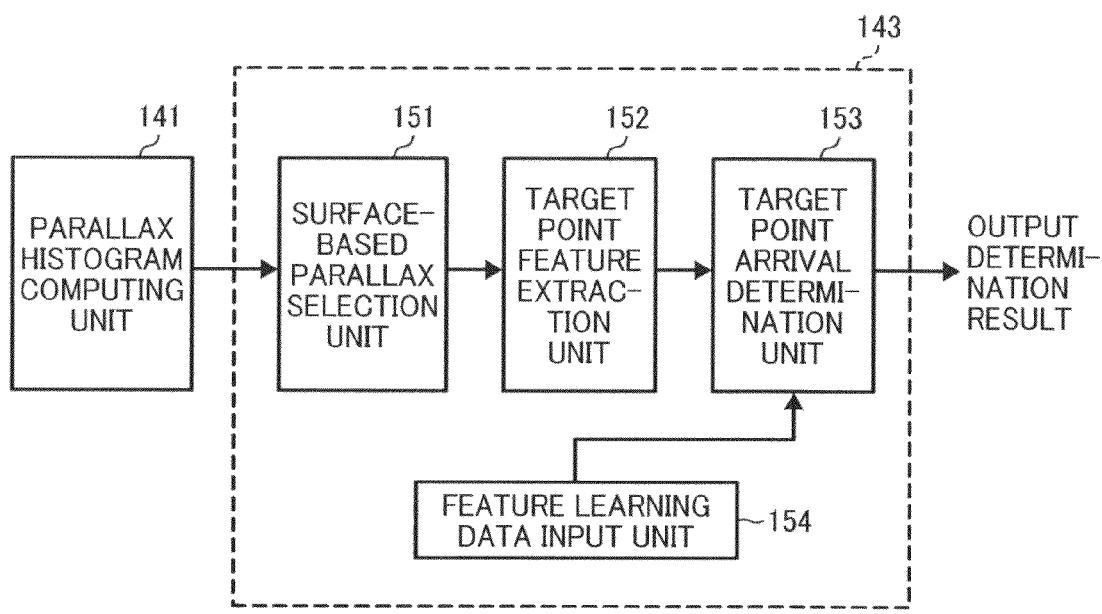
FIG. 15 shows a block diagram of a slope recognition unit according to an example embodiment.

A description is given of processing and controlling for detecting whether the vehicle 100 arrives at a point, shown in FIG. 14(a), where the surface condition changes to a downward slope or when the relative surface inclination condition changes to downward. When detecting whether the vehicle 100 arrives at a point where the surface condition changes to the downward slope surface, which may be referred to as down-slope inflection point, as shown in FIG. 15, the slope recognition unit 143 conducts functions of a surface-based parallax selection unit 151, a target point feature extraction unit 152, a target point arrival determination unit 153, and a feature learning data input unit 154.

Based on information of parallax histogram of each line output from the parallax histogram computing unit 141, the surface-based parallax selection unit 151 generates information of approximated curved line to identify an approximated curved line, which is obtained by the curved approximation of pixels on the above described line parallax histogram map (V map), and selects the parallax value of the pixels existing on the approximated curved line or its vicinity.

The approximated curved line information can be generated using known various curve approximation methods. In an example embodiment, for example, a polynomial approximation method using a polynomial equation shown in the following formula (1) is conducted. The series "n" of the polynomial equation can be set based on recognition experiments conducted in advance.

$$y = A_0 + A_1\Delta + A_2\Delta^2 + A_3\Delta^3 + \ldots A_n\Delta^n \quad (1)$$

Each coefficient of the polynomial equation such as $A_0, A_1, A_2, \ldots, A_n$ can be obtained by using the least-squares method. Specifically, by using values of a plurality of points $(y_i, \Delta_i)$, the following formula (2) is computed, and each coefficient of the polynomial equation is obtained by using the least-squares method.

$$y_i = A_0 + A_1\Delta_i + A_2\Delta_i^2 + A_3\Delta_i^3 + \ldots + A_n\Delta_i^n \quad (2)$$

The target point feature extraction unit 152 extracts a target point feature value to determine whether the vehicle 100 arrives at a target point such as down-slope inflection point. Specifically, the target point feature extraction unit 152 determines whether the vehicle 100 arrives at a point where the surface condition changes to a downward slope (i.e., the relative surface inclination changes to downward). In an example embodiment, as for the target point feature value, each coefficient of the polynomial equation $A_0, A_1, A_2, \ldots, A_n$ obtained by the polynomial approximation, and the above described minimum parallax value $\Delta 0$ are extracted. Specifically, for example, one coefficient $A_2$ of the polynomial equation and the minimum parallax value $\Delta 0$ are extracted as the target point feature value.

The target point arrival determination unit 153 determines whether the target point feature values $(A_2, \Delta 0)$ extracted by the target point feature extraction unit 152 satisfy a feature value condition that the vehicle 100 arrives at a target point. For example, the target point arrival determination unit 153 determines whether the target point feature value $(A_2, \Delta 0)$ satisfies a feature value condition that the vehicle 100 arrives at a point where the relative surface inclination condition changes to a downward slope (i.e. down-slope inflection point).

Specifically, images are captured at one or two or more target points and images are captured at one or two or more points not used as target points in advance, and prepared as captured image. Then, each coefficient of the polynomial equation $A_0, A_1, A_2, \ldots, A_n$ obtained by conducting the above described curve approximation to these captured images and the minimum parallax value $\Delta 0$ are extracted. In an example embodiment, a machine learning technique such as support vector machine (SVM) is conducted by using such obtained learning data corresponding to the target points and learning data not corresponding to the target points, and an evaluation function to classify feature values corresponding to the target points and feature values not corresponding to the target points is identified. Specifically, by using the learning data, each coefficient of the evaluation function $k_0, k_1, k_2, \ldots, k_n$ of the following formula (3) and $k\Delta$ are obtained.

$$K = k0 \times A_0 + k1 \times A_1 + k2 \times A_2 + k3 \times A_3 + \ldots + kn \times A_n + k\Delta \times \Delta_0 \quad (3)$$

Figure 16:
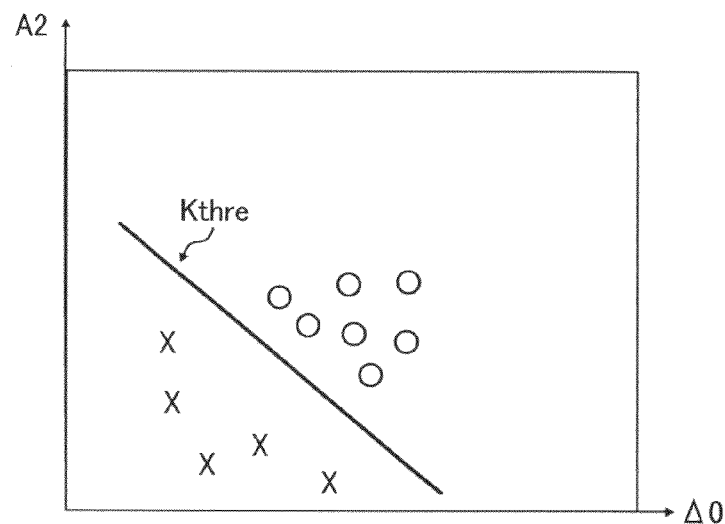
FIG. 16 is a graph showing a classified result of classified learning data using a machine learning technique.

FIG. 16 is a graph showing a classified result of classified learning data according to an example embodiment using the machine learning technique. FIG. 16 shows a two-dimensional orthogonal coordinate system, in which the vertical axis of the graph represents polynomial equation coefficient A2, which is a target point feature value, and the horizontal axis of the graph represents the minimum parallax value Δ0, which is another target point feature value. FIG. 16 shows learning data distribution and a suitable threshold $K_{thre}$. The circles "O" in the graph are plotted feature values ($A_2$, Δ0) of the image captured at down-slope inflection points which are the target point. Further, the cross "X" in the graph are plotted feature values ($A_2$, Δ0) of the image captured at points which are not the target point at various timing.

When determining whether the target point feature value ($A_2$, Δ0) extracted by the target point feature extraction unit 152 satisfies the feature value condition, the target point arrival determination unit 153 inputs the target point feature value ($A_2$, Δ0) to the evaluation function shown in the above formula (3) to compute the evaluation K. Then, the target point arrival determination unit 153 determines whether the evaluation K satisfies the feature value condition. Specifically, the target point arrival determination unit 153 determines whether the evaluation K is greater than the threshold $K_{thre}$ obtained by the machine learning of SVM.

If the evaluation K is greater than the threshold $K_{thre}$, the target point arrival determination unit 153 determines that the target point arrival condition is satisfied, and outputs a determination result indicating that the vehicle 100 arrives at the target point. By contrast, if the evaluation K is the threshold $K_{thre}$ or less, the target point arrival determination unit 153 determines that the target point arrival condition is not satisfied, and outputs a determination result indicating that the vehicle 100 does not reach the target point.

Although one coefficient of the polynomial equation such as coefficient $A_2$ is used to determine whether the feature value condition is satisfied, the used coefficient is not limited hereto. For example, one coefficient in the polynomial equation other than coefficient $A_2$ can be used, or a plurality of coefficients of the polynomial equation can be used. When only one coefficient of the polynomial equation is used, error recognition can be reduced whereas when a plurality of coefficients of the polynomial equation is used, recognition of complex shape can be conducted. The number of used coefficients can be determined depending on a recognition target.

As above described, the target point arrival determination unit 153 of the slope recognition unit 143 outputs a determination result indicating that the vehicle 100 arrives at the target point such as reaching at the down-slope inflection point. The determination result is transmitted to the later processing unit and used for various processing. For example, based on this determination result transmitted to the vehicle drive unit 106, the vehicle drive control unit 106 conducts the cruise assistance control such as displaying a warning message on the display monitor 103 of the vehicle 100 to decrease the speed of the vehicle 100, and the vehicle speed control that decreases the speed of the vehicle 100.

Further, the luminance image data captured by the first capturing unit 110A is transmitted to a luminance image edge extraction unit 145. Then, the luminance image edge extraction unit 145 extracts a portion of the luminance image as an edge portion, in which the luminance image edge extraction unit 145 extracts a portion of the luminance image where the pixel value (luminance) changes greater than a given reference value as an edge portion. The luminance image edge extraction unit 145 generates luminance edge image data from the extraction result.

The luminance edge image data is image data expressing the edge portion and the non-edge portion as binary data. The edge extraction can be conducted using known methods. The luminance edge image data generated by the luminance image edge extraction unit 145 is transmitted to a line recognition unit 149.

The line recognition unit 149 recognizes an image of line on a surface such as a white line on a road surface based on the luminance edge image data. For example, white lines are typically formed on a substantially black-colored road surface, in which luminance of line image on a luminance image is far greater than luminance of other part of the road. Therefore, the edge portion having luminance greater than a given value on the luminance image can be assumed as the edge portion of white line. Further, because the line image corresponding to the white line on the road surface is displayed as a line image on the captured image, by identifying the edge portions arranged with a line pattern, the edge portion of white line can be recognized with high precision. The line recognition unit 149 conducts a linear approximation to the luminance edge image data obtained from the luminance image edge extraction unit 145 using the least-squares method and Hough conversion, and recognizes the obtained approximated straight line as the edge portion of the line displaying the white line on the road surface.

The recognition result of the white line is transmitted to a later stage processing unit and used for various processing. For example, when the vehicle 100 is to be drifted from the lane, the vehicle drive control unit 106 conducts the cruise assistance control such as reporting a warning to a driver of the vehicle 100 and controlling the steering and brakes of the vehicle 100. Further, in the recognition processing of white line, the recognition result of the surface area RS recognized by the surface recognition unit 142 can be used for the recognition processing of the line image. Specifically, by conducting the recognition processing of the line image to the luminance edge portion in the surface area RS, the work load of recognition processing can be reduced, and the recognition precision can be enhanced.

Figure 17:
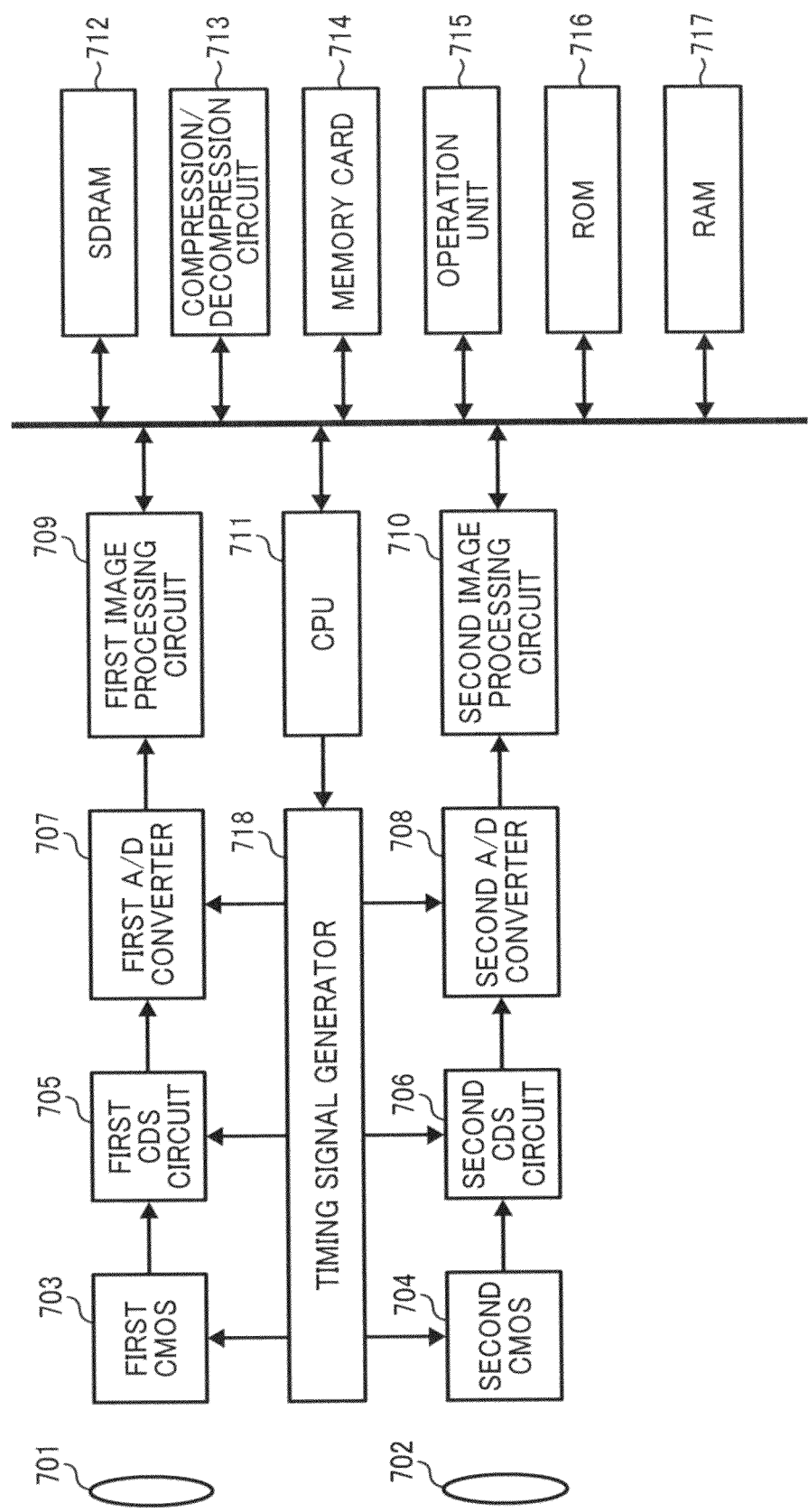
FIG. 17 shows a block diagram of a hardware configuration of a stereo camera of a vehicle-mounted device control system according to an example embodiment.

A description is given of a hardware configuration of the stereo camera, which is an example of vehicle-mounted stereo camera. FIG. 17 shows a block diagram of a hardware configuration of the stereo camera, which is an example of the vehicle-mounted device control system.

As shown in FIG. 17, light coming from an object passes a first capturing lens 701 and a second capturing lens 702 of the image capturing unit 101, and enters a first complementary metal oxide semiconductor (CMOS) 703 and a second CMOS 704. The first CMOS 703 and the second CMOS 704 convert an optical image focused on an image capturing surface to electrical signals of analog image data, and outputs the analog image data.

The first signal processor 114A of FIG. 2 includes, for example, a first correlated double sampling (CDS) circuit 705, a first A/D converter 707, and a first image processing circuit 709. The second signal processor 114B of FIG. 2 includes, for example, a second CDS circuit 706, a second A/D converter 708, and a second image processing circuit 710. The processing hardware 120 and the MPU 140 of FIG. 2 includes, for example, a central processing unit (CPU) 711, a synchronous dynamic random access memory (SDRAM) 712, a compression/decompression circuit 713, a read only memory (ROM) 716, a random access memory (RAM) 717 and a timing signal generator 718.

Noise is removed from the analog image data output from the first CMOS 703 by the first CDS circuit 705, and noise is removed from the analog image data output from the second CMOS 704 by the second CDS circuit 706. Then, the noise-removed analog image data is converted to digital data by the first A/D converter 707 and the second A/D converter 708, and then output to the first image processing circuit 709 and the second image processing circuit 710.

The first image processing circuit 709 and the second image processing circuit 710 conducts various image processing such as YCrCb conversion processing, white balance processing, contrast correction processing, edge enhancement processing, and color conversion processing using the SDRAM 712 storing image data temporarily, in which the white balance processing adjusts density of color of image data, the contrast correction processing adjusts contrast of image data, the edge enhancement processing adjusts sharpness of image data, and the color conversion processing adjusts hue of image data.

Further, the image data having received signal processing and image processing is stored, for example, in a memory card 714 via the compression/decompression circuit 713. The compression/decompression circuit 713 compresses the image data output from the first image processing circuit 709 and the second image processing circuit 710 and outputs compressed image data to the memory card 714, and decompresses the image data read from the memory card 714 and outputs the decompressed image data to the first image processing circuit 709 and the second image processing circuit 710.

Further, operation timing of the first CMOS 703, the second CMOS 704, the first CDS circuit 705, the second CDS circuit 706, the first A/D converter 707, and the second A/D converter 708 are controlled by the CPU 711 via a timing signal generator 718 that generates timing signals. Further, the first image processing circuit 709, the second image processing circuit 710, the compression/decompression circuit 713, and the memory card 714 are connected to the CPU 711 and controlled by the CPU 711.

The CPU 711 conducts various computing processes using various programs such as the target point arrival detection program to execute the above described target point arrival detection process. The CPU 711 is connected to the ROM 716 and the RAM 717 via the bus line. The ROM 716 is a read only memory that stores programs or the like. The RAM 717 can be used as a working area for various computing processes, and includes various data storage area, to which data can be written and read.

The CPU 711 can configure the above described parallax computing unit 121, the parallax histogram computing unit 141, the surface recognition unit 142, the slope recognition unit 143, luminance image edge extraction unit 145, and the line recognition unit 149 by executing the target point arrival detection program. A part or entire units can be configured as a module.

The above described example embodiment has following features. In the above described example embodiment, an image of a surface such as a road surface ahead of the vehicle 100 which moves over the surface can be captured by an image capturing unit including the first and second capturing units 110A and 110B. The above described target point arrival detector such as the image analyzer 102 can detect whether the vehicle 100 arrives at a target point based on the captured image. The target point arrival detector includes a target point arrival signal output unit such as slope recognition unit 143 including the target point arrival determination unit 153 that outputs a signal indicating that the vehicle 100 arrives at the target point based on the captured image. The target point is, for example, a point where surface inclination condition ahead of the vehicle 100 changes to downward with respect to the surface where the vehicle 100 is moving.

With this configuration, it can effectively detect that the vehicle 100 is to reach a down-slope inflection point having a poor vision. Therefore, when the vehicle 100 arrives at such point, the vehicle drive control unit 106 can conduct the cruise assistance control such as reporting a warning to a driver of the vehicle 100 to decrease the speed of the vehicle 100, and the vehicle speed control that decreases the speed of the vehicle 100, with which accidents at the down-slope inflection point having a poor vision can be prevented.

In the above described example embodiment, the target point arrival detector includes a parallax information generator, a parallax histogram information generator, an approximated curved line information generator. The parallax information generator such as the parallax computing unit 121 generates parallax information based on a plurality of captured images ahead of the vehicle 100 captured by a plurality of image capturing units such as the first and second capturing units 110A and 110B. The parallax histogram information generator such as the parallax histogram computing unit 141 that generates parallax histogram information, based on the parallax information, indicating parallax value $\Delta$ mapping condition in each line prepared by dividing the captured image into a plurality of areas vertically (upper and lower direction). Based on the parallax histogram information, among parallax values having a frequency greater than a preset reference value, the a approximated curved line information generator such as the surface-based parallax selection unit 151 selects a group of parallax values having a feature that parallax value becomes smaller as closer to an upper part of the captured image, and generates approximated curved line information for the selected group of parallax value. The target point arrival signal output unit outputs a signal indicating that the vehicle 100 arrives at a target point when the approximated curved line information satisfies a given target point arrival condition. In the above described example embodiment, based on the generated parallax histogram information, among parallax values having a frequency greater than a preset reference value, a group of parallax values having a feature that parallax value becomes smaller as closer to an upper part of the captured image are selected. In this disclosure, the parallax value may mean a representative value of parallax values having a given range of parallax values. It can be estimated that pixels on the captured image corresponding to a group of parallax values matched to the above described feature compose a surface image area displaying the surface ahead of the vehicle 100 with high precision. Therefore, it can be assumed that the selected group of parallax values correspond to parallax values for each line of the surface image area in the captured image. For example, one case when the vehicle 100 arrives at the surface slope inflection point having a poor vision is considered, in which the surface inclination condition (or relative surface inclination condition ahead of the vehicle 100 with respect to the surface of the vehicle 100 moves on changes to a downward slope. In this case, the surface area displayed on the line area on the captured image is far from the vehicle compared to a case when the relative surface inclination condition is flat, wherein in the flat case, the relative surface inclination condition does not change. Therefore, parallax values of the same line corresponding to the surface image area in the captured image when the relative surface inclination condition is a downward slope become smaller than the parallax values when the relative surface inclination condition is flat. When the relative surface inclination condition is flat, parallax value of each line corresponding to a surface image area in the captured image becomes smaller as closer to the upper part of the captured image with a straight line pattern. By contrast, when the relative surface inclination condition is a downward slope, the relative surface inclination condition of the surface changes gradually, and therefore, parallax value of each line becomes smaller as closer to the upper part of the captured image with a curved line pattern. Therefore, based on the selected group of parallax values that match the feature of smaller value as closer to the upper part of the captured image, the approximated curved line is obtained, and it can determine whether the relative surface inclination condition ahead of the vehicle 100 is downward, and therefore, it can detect that the vehicle 100 arrives at the surface slope inflection point having a poor vision. Therefore, when the vehicle 100 arrives at such point, the vehicle drive control unit 106 can conduct the cruise assistance control such as reporting a warning to a driver of the vehicle 100 to decrease the speed of the vehicle 100, and the vehicle speed control that decreases the speed of the vehicle 100, with which accidents at the down-slope inflection point having a poor vision can be prevented.

In this disclosure, the relative surface inclination condition of surface is defined a surface with respect to a virtually extended face extended along the surface where the vehicle 100 moves on to the ahead of the vehicle 100. When a surface corresponding to each line is positioned at an upper part with respect to the virtually extended face, the relative surface inclination condition of the surface is set upward. When a surface corresponding to each line is positioned at a lower part with respect to the virtually extended face, the relative surface inclination condition of the surface is set downward.

In the above described example embodiment, the target point arrival signal output unit extracts the target point feature value ($A_2$, $\Delta 0$) from the approximated curved line information. If the extracted target point feature value satisfies a given feature value condition such as $K > K_{thre}$, it is determined that the above described given target point arrival condition is satisfied, and the target point arrival signal output unit outputs a signal indicating that the vehicle 100 arrives at the target point. With this configuration, it can determine whether the vehicle 100 arrives at the down-slope inflection point having a poor vision easily and efficiently.

In the above described example embodiment, the approximated curved line information is prepared on a two-dimensional orthogonal coordinate system defined by the vertical direction of the captured image as position y and the horizontal direction as parallax value $\Delta$ by plotting the above selected group of parallax values $\Delta$ on the two-dimensional orthogonal coordinate system so that the approximated curved line is identified. With this configuration, approximated curved line information can be generated easily.

In the above described example embodiment, the approximated curved line information is information of the approximated curved line using the polynomial equation. The target point arrival signal output unit extracts the coefficient $A_2$ of the polynomial equation corresponding to the approximated curved line information, and the minimum parallax $\Delta 0$, which is the smallest in the selected group of parallax values as the target point feature value. If the extracted target point feature value ($A_2$, $\Delta 0$) satisfies the given feature value condition such as $K > K_{thre}$, it is determined that the target point arrival condition is satisfied, and the target point arrival signal output unit outputs a signal indicating that the vehicle 100 arrives at the target point. With this configuration, it can determine whether the vehicle 100 arrives at the down-slope inflection point having a poor vision easily and efficiently.

In the above described example embodiment, the target point arrival signal output unit determines whether the approximated curved line information satisfies a given target point arrival condition using learning data obtained by capturing images of the target point in advance and capturing images of non-target point. With this configuration, it can determine whether the approximated curved line information satisfies the target point arrival condition effectively.

In the above described example embodiment, a non-transitory computer-readable carrier medium or storage medium storing a line recognition program that, when executed by a computer having a processor, causes the computer to execute a method of detecting a condition of a surface ahead of a vehicle moving on the surface based on a plurality of images captured with an image capturing unit is devised. The method includes the steps of: generating parallax information based on the plurality of captured images captured with the image capturing unit; generating parallax histogram information, based on the parallax information, indicating parallax value mapping condition for each line prepared by dividing the captured image into a plurality of areas vertically (upper and lower direction); selecting a group of parallax values having a feature that parallax values become smaller as closer to an upper part of the captured image among parallax values greater than a preset reference value, based on the parallax histogram information; generating approximated curved line information for the selected group of parallax values; outputting a signal indicating that the vehicle arrives at a target point when the approximated curved line information satisfies a given target point arrival condition.

With this configuration, it can determine whether the vehicle 100 arrives at the down-slope inflection point having a poor vision effectively. Therefore, the vehicle 100 arrives at such point, the vehicle drive control unit 106 can conduct the cruise assistance control such as reporting a warning to a driver of the vehicle 100 to decrease the speed of the vehicle 100, and the vehicle speed control that decreases the speed of the vehicle 100, with which accidents at the down-slope inflection point having a poor vision can be prevented.

The program can be distributed by storing the program in a storage medium or carrier medium such as CD-ROM. Further, the program can be distributed by transmitting signals from a given transmission device via a transmission medium such as communication line or network (e.g., public phone line, specific line) and receiving the signals. When transmitting signals, a part of data of the program is transmitted in the transmission medium, which means, entire data of the program is not required to be on in the transmission medium. The signal for transmitting the program is a given carrier wave of data signal including the program. Further, the program can be distributed from a given transmission device by transmitting data of program continually or intermittently.

The present invention can be implemented in any convenient form, for example using dedicated hardware, or a mixture of dedicated hardware and software. The present invention may be implemented as computer software implemented by one or more networked processing apparatuses. The network can comprise any conventional terrestrial or wireless communications network, such as the Internet. The processing apparatuses can compromise any suitably programmed apparatuses such as a general purpose computer, personal digital assistant, mobile telephone (such as a Wireless Application Protocol (WAP) or 3G-compliant phone) and so on. Since the present invention can be implemented as software, each and every aspect of the present invention thus encompasses computer software implementable on a programmable device.

The computer software can be provided to the programmable device using any storage medium, carrier medium, carrier means, or digital data carrier for storing processor readable code such as a flexible disk, a compact disk read only memory (CD-ROM), a digital versatile disk read only memory (DVD-ROM), DVD recording only/rewritable (DVD-R/RW), electrically erasable and programmable read only memory (EEPROM), erasable programmable read only memory (EPROM), a memory card or stick such as USB memory, a memory chip, a mini disk (MD), a magneto optical disc (MO), magnetic Tape, a hard disk in a server, a solid state memory device or the like, but not limited these.

The hardware platform includes any desired kind of hardware resources including, for example, a central processing unit (CPU), a random access memory (RAM), and a hard disk drive (HDD). The CPU may be implemented by any desired kind of any desired number of processor. The RAM may be implemented by any desired kind of volatile or non-volatile memory. The HDD may be implemented by any desired kind of non-volatile memory capable of storing a large amount of data. The hardware resources may additionally include an input device, an output device, or a network device, depending on the type of the apparatus. Alternatively, the HDD may be provided outside of the apparatus as long as the HDD is accessible. In this example, the CPU, such as a cache memory of the CPU, and the RAM may function as a physical memory or a primary memory of the apparatus, while the HDD may function as a secondary memory of the apparatus.

In the above-described example embodiment, a computer can be used with a computer-readable program, described by object-oriented programming languages such as C++, Java (registered trademark), JavaScript (registered trademark), Perl, Ruby, or legacy programming languages such as machine language, assembler language to control functional units used for the apparatus or system. For example, a particular computer (e.g., personal computer, work station) may control an information processing apparatus or an image processing apparatus such as image forming apparatus using a computer-readable program, which can execute the above-described processes or steps. In the above described embodiments, at least one or more of the units of apparatus can be implemented in hardware or as a combination of hardware/software combination. In example embodiment, processing units, computing units, or controllers can be configured with using various types of processors, circuits, or the like such as a programmed processor, a circuit, an application specific integrated circuit (ASIC), used singly or in combination.

In the above described example embodiment, the vehicle-mounted device control system 1000 includes, for example, an information detector such as the image analyzer 102 that detects information around the vehicle 100 (mobile vehicle) moving on a surface, and a vehicle device controller such as the vehicle drive control unit 106 that controls one or more devices such as the steering and brakes, the display unit 103 or the like mounted on the vehicle 100 based on a detection signal output from the information detector, in which the information detector employs the above described target point arrival detector.

With this configuration, it can determine whether the vehicle 100 arrives at the down-slope inflection point having a poor vision effectively. Therefore, when the vehicle 100 arrives at such point, the vehicle drive control unit 106 can conduct the cruise assistance control such as reporting a warning to a driver of the vehicle 100 to decrease the speed of the vehicle 100, and the vehicle speed control that decreases the speed of the vehicle 100.

In the above described target point arrival detector, target point arrival detection program and a vehicle-mounted device control system according to an example embodiment, it can detect whether a vehicle arrives at a surface slope inflection point having a poor vision. When the vehicle arrives at such point, the vehicle drive control unit can conduct the cruise assistance control such as reporting a warning to a driver of the vehicle to decrease the speed of the vehicle, and the vehicle speed control that decreases the speed of the vehicle, with which accidents at a point where a surface is inclined and has a poor vision can be prevented.

The present invention can be implemented in any convenient form, for example using dedicated hardware, or a mixture of dedicated hardware and software. The present invention may be implemented as computer software implemented by one or more networked processing apparatuses. The network can comprise any conventional terrestrial or wireless communications network, such as the Internet. The processing apparatuses can compromise any suitably programmed apparatuses such as a general purpose computer, personal digital assistant, mobile telephone (such as a Wireless Application Protocol (WAP) or 3G-compliant phone) and so on. Since the present invention can be implemented as software, each and every aspect of the present invention thus encompasses computer software implementable on a programmable device.

The computer software can be provided to the programmable device using any storage medium, carrier medium, carrier means, or digital data carrier for storing processor readable code such as a flexible disk, a compact disk read only memory (CD-ROM), a digital versatile disk read only memory (DVD-ROM), DVD recording only/rewritable (DVD-R/RW), electrically erasable and programmable read only memory (EEPROM), erasable programmable read only memory (EPROM), a memory card or stick such as USB memory, a memory chip, a mini disk (MD), a magneto optical disc (MO), magnetic tape, a hard disk in a server, a solid state memory device or the like, but not limited these.

The hardware platform includes any desired kind of hardware resources including, for example, a central processing unit (CPU), a random access memory (RAM), and a hard disk drive (HDD). The CPU may be implemented by any desired kind of any desired number of processor. The RAM may be implemented by any desired kind of volatile or non-volatile memory. The HDD may be implemented by any desired kind of non-volatile memory capable of storing a large amount of data. The hardware resources may additionally include an input device, an output device, or a network device, depending on the type of the apparatus. Alternatively, the HDD may be provided outside of the apparatus as long as the HDD is accessible. In this example, the CPU, such as a cache memory of the CPU, and the RAM may function as a physical memory or a primary memory of the apparatus, while the HDD may function as a secondary memory of the apparatus.

In the above-described example embodiment, a computer can be used with a computer-readable program, described by object-oriented programming languages such as C++, Java (registered trademark), JavaScript (registered trademark), Perl, Ruby, or legacy programming languages such as machine language, assembler language to control functional units used for the apparatus or system. For example, a particular computer (e.g., personal computer, work station) may control an information processing apparatus or an image processing apparatus such as image forming apparatus using a computer-readable program, which can execute the above-described processes or steps. In the above described embodiments, at least one or more of the units of apparatus can be implemented in hardware or as a combination of hardware/software. In example embodiment, processing units, computing units, or controllers can be configured with using various types of processors, circuits, or the like such as a programmed processor, a circuit, an application specific integrated circuit (ASIC), used singly or in combination.

Numerous additional modifications and variations are possible in light of the above teachings. It is therefore to be understood that, within the scope of the appended claims, the disclosure of the present invention may be practiced otherwise than as specifically described herein. For example, elements and/or features of different examples and illustrative embodiments may be combined each other and/or substituted for each other within the scope of this disclosure and appended claims.

What is claimed is:

1. A target point arrival detector for detecting that a vehicle arrives at a target point based on an image ahead of the vehicle moving on a surface captured by an image capturing unit, the target point arrival detector comprising:
   a target point arrival signal output unit, using a processing circuit, to output a signal indicating that the vehicle arrives at the target point where a surface ahead of the vehicle changes to a downward slope with respect to a surface over which the vehicle moves based on the captured image;
   a parallax information generator, using the processing circuit, to generate parallax information based on a plurality of captured images of an area ahead of the vehicle captured by a plurality of image capturing units;
   a parallax histogram information generator, using the processing circuit, to generate parallax histogram information, based on the parallax information, indicating parallax value mapping conditions for each of a plurality of lines prepared by dividing captured image into a plurality of areas vertically; and
   an approximated curved line information generator, using the processing circuit, to select a group of parallax values, all of the parallax values decreasing as they approach an upper art of the captured imam values greater than a preset reference value, based on the parallax histogram information, and to generate approximated curved line information for the selected group of parallax values,
   wherein the target point arrival signal output unit, using the processing circuit, outputs a signal indicating that the vehicle arrives at the target point when the approximated curved line information satisfies a given target point arrival condition.

2. The target point arrival detector of claim 1, wherein the target point arrival signal output unit extracts a target point feature value from the approximated curved line information,
   wherein the target point arrival signal output unit determines that the given target point arrival condition is satisfied when the extracted target point feature value satisfies a given feature value condition, and outputs a signal indicating that the vehicle arrives at the target point.

3. The target point arrival target point detector of claim 1, wherein the approximated curved line information is information that identifies an approximated curved line drawn on a two-dimensional orthogonal coordinate system that plots the selected group of parallax values against the two dimensional orthogonal coordinate system defined by positions of the captured image in a vertical direction and parallax value.

4. The target point arrival detector of claim 3, wherein the approximated curved line information is information of the approximated curved line approximated by a polynomial equation,
   wherein the target point arrival signal output unit extracts a coefficient of the polynomial equation corresponding to the approximated curved line information and a minimum parallax value of the selected group of parallax values as a target point feature value,
   wherein the target point arrival signal output unit determines that the given target point arrival condition is satisfied when the extracted target point feature value satisfies a given feature value condition, and outputs a signal indicating that the vehicle arrives at the target point.

5. The target point arrival detector of claim 1, wherein the target point arrival signal output unit determines whether the approximated curved line information satisfies a given target point arrival condition by using learning data composed of image data obtained by capturing the target point in advance and image data obtained by capturing a point which is not the target point.

6. A method of detecting a condition of a surface ahead of a vehicle moving on the surface based on a plurality of images captured with an image capturing unit, the method comprising the steps of:
   generating parallax information based on the plurality of captured images captured with the image capturing unit;
   generating parallax histogram information, based on the parallax information, indicating parallax value mapping condition for each line prepared by dividing the captured image into a plurality of areas vertically;
   selecting a group of parallax values, all of the parallax values decreasing as they approach an upper part of the captured image, among parallax values greater than a preset reference value, based on the parallax histogram information;
   generating approximated curved line information for the selected group of parallax values; and
   outputting a signal indicating that the vehicle arrives at a target point when the approximated curved line information satisfies a given target point arrival condition.

7. A non-transitory computer-readable storage medium storing a line recognition program that, when executed by a computer having a processor, causes the computer to execute a method of detecting a condition of a surface ahead of a vehicle moving on the surface based on a plurality of images captured with an image capturing unit, the method comprising the steps of:
   generating parallax information based on the plurality of captured images captured with the image capturing unit;
   generating parallax histogram information, based on the parallax information, indicating parallax value mapping condition for each line prepared by dividing the captured image into a plurality of areas vertically;
   selecting a group of parallax values, all of the parallax values decreasing as they approach an upper part of the captured image, among parallax values greater than a preset reference value, based on the parallax histogram information;
   generating approximated curved line information for the selected group of parallax values; and
   outputting a signal indicating that the vehicle arrives at a target point when the approximated curved line information satisfies a given target point arrival condition.

8. A vehicle-mounted device control system comprising:
   an information detector employing the target point arrival detector of claim 1 that detects information around a vehicle moving on a surface; and
   a vehicle device controller that controls one or more devices mounted on the vehicle based on a detection signal output from the information detector.

* * * * *